United States Patent
Yoshino et al.

(10) Patent No.: US 7,489,390 B2
(45) Date of Patent: Feb. 10, 2009

(54) PULSE LIGHT RECEIVING TIME MEASUREMENT APPARATUS AND DISTANCE MEASUREMENT INCLUDING THE SAME

(75) Inventors: Kenichiro Yoshino, Itabashi-ku (JP); Isao Minegishi, Itabashi-ku (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 11/901,829

(22) Filed: Sep. 19, 2007

(65) Prior Publication Data

US 2008/0068585 A1  Mar. 20, 2008

(30) Foreign Application Priority Data

Sep. 20, 2006  (JP) .............................. 2006-254104

(51) Int. Cl.
  *G01C 3/08* (2006.01)
(52) U.S. Cl. ..................................... 356/5.01; 356/4.01
(58) Field of Classification Search ................ 356/4.01, 356/5.01–5.15
  See application file for complete search history.

(56) References Cited

U.S. PATENT DOCUMENTS 5,932,802 A * 8/1999 Ogawa ..................... 73/504.02
7,245,359 B1 * 7/2007 Hoashi ....................... 356/5.01
7,405,812 B1 * 7/2008 Bamji ......................... 356/5.1

FOREIGN PATENT DOCUMENTS

JP  2005-214786  8/2005

* cited by examiner

Primary Examiner—Isam Alsomiri
(74) Attorney, Agent, or Firm—Chapman and Cutler LLP (57) ABSTRACT

A pulse light receiving time measurement apparatus according to the present invention includes a light receiving element receiving reflected pulse light from an object to be measured; a pulse light receiving time measurement circuit measuring a time when pulse light is irradiated to the object and a time when the reflected pulse light from the object is received at the light receiving element; a resonance circuit converting an optical pulse signal of the reflected pulse light from the light receiving element into a damping signal; a multi-stage amplifier group amplifying the damping signal from the resonance circuit; a damping signal processing circuit composed of amplitude comparators and zero-cross comparators, and processing the damping signal from each stage of the multi-stage amplifier group, in which operations of the respective zero-cross comparators are determined according to comparison results of the respective amplitude comparators for the amplifier group.

15 Claims, 7 Drawing Sheets

PULSE LIGHT RECEIVING TIME MEASUREMENT APPARATUS AND DISTANCE MEASUREMENT INCLUDING THE SAME

PRIORITY CLAIM

The present application is based on and claims priority from Japanese Application Number 2006-254104, filed on Sep. 20, 2006, the disclosure of which is hereby incorporated by reference herein in its entirety.

BACKGROUND OF THE INVENTION

1. Field of the Invention

The present invention relates to improvement and modification in a pulse light receiving time measurement apparatus and a distance measurement apparatus including the pulse light receiving time measurement apparatus.

2. Description of Related Art

Conventionally, a distance measurement apparatus has been developed for measuring a distance from the apparatus to a measuring object at a high speed by irradiating pulse light to the object and receiving reflected light from the object at a light receiving element to thereby measure a time from the irradiation of the pulse light to the reflected light's reaching at the light receiving element from the object (See Japanese Patent Application Laid-Open Publication No. 2005-214786).

Moreover, in recent years, there has been an increasing demand for three-dimensionally measuring, at a high speed, a distance to an object which ranges from a natural object with low reflectivity to a retroreflective member with high reflectivity.

The conventional metrology device which measures the distance by optically adjusting amount of light cannot deal with the above high-speed measurement of the distance to the object, and moreover, it has to have an optical receiver circuit which can detect amounts of light in a large range from extremely small to large.

However, an amplifier used for the optical receiver circuit generally has a dynamic range in which the maximum value is five to ten times as large as the minimum value. In order to measure reflected light from various objects form the natural object to the retroreflective member, the dynamic range in which the maximum value is over 1,000 times as large as the minimum value is needed. Therefore, the amplifier needs to be configured to have multiple stages in order to achieve such a large dynamic range.

However, addition of a pulse light receiving time measurement circuit to each of the multiple stages of the amplifier makes the scale of the circuit larger, which is disadvantageous.

SUMMARY OF THE INVENTION

An object of the present invention is to provide a pulse light receiving time measurement apparatus suitable for use in a distance measurement apparatus which performs three-dimensional, high-speed measurement of various objects ranging from the natural object with low reflectivity to the retroreflective member with high reflectivity without enlarging the circuit scale, as well as to provide the distance measurement apparatus.

A pulse light receiving time measurement apparatus according to an embodiment of the present invention includes a light receiving element receiving reflected pulse light from an object to be measured; a pulse light receiving time measurement circuit measuring a time when pulse light is irradiated to the object to be measured and a time when the reflected pulse light from the object to be measured is received at the light receiving element; a resonance circuit converting an optical pulse signal of the reflected pulse light from the light receiving element into a damping signal; a multi-stage amplifier group amplifying the damping signal from the resonance circuit; a damping signal processing circuit composed of amplitude comparators and zero-cross comparators, and processing the damping signal from each stage of the multi-stage amplifier group which is connected with a pair of an amplitude comparator and a zero-cross comparator, the amplitude comparators comparing amplitude of the damping signal with a predetermined value, the zero-cross comparators detecting that the damping signal crosses a bias level; and an integrated logic circuit combining a plurality of signal lines from the zero-cross comparator into one for output to the pulse light receiving time measurement circuit, in which operations of the respective zero-cross comparators are determined according to comparison results of the respective amplitude comparators for the amplifier group.

Preferably, the pulse light receiving time measurement apparatus further includes an attenuator composed of a ladder-type resistor, provided between the resonance circuit and the multi-stage amplifier group, and attenuating an amplitude of received pulse light of a large amount at an arbitrary attenuation rate.

Preferably, the damping signal from the resonance circuit is input to the attenuator, and a plurality of damping signals voltage-divided arbitrarily by the ladder-type resistor and a damping signal not voltage-divided are input to the multi-stage amplifier group, to expand a range of detection of amounts of light from extremely small to large.

A pulse light receiving time measurement apparatus according to another embodiment of the present invention includes a light receiving element receiving reflected pulse light from an object to be measured and pulse light guided to an internal optical reference path; a pulse light receiving time measurement circuit measuring a time when pulse light is irradiated to the object to be measured and a time when the reflected pulse light from the object to be measured is received at the light receiving element; a resonance circuit converting an optical pulse signal of each pulse light output from the light receiving element into a damping signal; a multi-stage amplifier group amplifying a damping signal output from the resonance circuit; a damping signal processing circuit composed of amplitude comparators and zero-cross comparators, processing a damping signal output from each of the multi-stage of the amplifier group which is connected with a pair of an amplitude comparator and a zero-cross comparator, and determining operations of the respective zero-cross comparators according to comparison results of the respective amplitude comparators for the amplifier group, the amplitude comparators comparing amplitude of the damping signal with a predetermined value, the zero-cross comparators detecting that the damping signal crosses a bias level; and an integrated logic circuit combining a plurality of signal lines from the zero-cross comparator into one for output to the pulse light receiving time measurement circuit.

In addition, the pulse light receiving time measurement apparatus can further include an attenuator composed of a ladder-type resistor, provided between the resonance circuit and the attenuator.

It can be configured that the damping signal output from the resonance circuit is input to the attenuator, and a plurality of damping signals voltage-divided by the ladder-type resistor and a damping signal not voltage-divided are input to the multi-stage amplifier group.

A distance measurement apparatus according to the present invention includes a light receiving element receiving reflected pulse light from an object to be measured and pulse light guided to an internal optical reference path; a resonance circuit converting an optical pulse signal of each pulse light output from the light receiving element into a damping signal; a multi-stage amplifier group amplifying a damping signal output from the resonance circuit; a damping signal processing circuit composed of amplitude comparators and zero-cross comparators, processing a damping signal output from each of the multiple stages of the amplifier group to obtain a signal for acquiring a difference in time between emission of pulse light and the pulse light's reaching the light receiving element; and a processing unit receiving the signal processed by the damping signal processing circuit and obtaining a distance from the measurement apparatus to the object to be measured according to the difference in time acquired.

Preferably, the damping signal processing circuit is composed of a group of amplitude comparators comparing amplitude of the damping signal with a predetermined value, and a group of zero-cross comparators detecting that the damping signal crosses a bias level, the amplitude comparators and the zero-cross comparator being of a same number.

Preferably, each of the zero-cross comparators outputs the signal for acquiring the difference in time to the processing unit, and each of the amplitude comparators outputs, to each zero-cross comparator, a permit/inhibit signal for selectively permitting/inhibiting the output of the signal for acquiring the difference in time to the processing unit.

The distance measurement apparatus according to the present invention can further include an attenuator composed of a ladder-type resistor and provided between the resonance circuit and the multi-stage amplifier group.

Preferably, the damping signal output from the resonance circuit is input to the attenuator and a plurality of damping signals voltage-divided by the ladder-type resistor and a damping signal not voltage-divided are input to the multi-stage amplifier group.

It can be configured that the resonance circuit is composed of a plurality of resistors and one or more coils, and the attenuator is composed of one or more transistors and a plurality of resistors.

The distance measurement apparatus according to the present invention can further include an integrated logic circuit provided between the damping signal processing circuit and the processing unit and combining respective signal lines from the zero-cross comparators into one for output to the processing unit.

It can be configured that the multi-stage amplifier group is composed of a plurality of amplifiers having a same gain.

It can be configured that upon every amplification by each amplifier, the damping signal output from the resonance circuit is amplified by a multiple of a power of the gain.

BRIEF DESCRIPTION OF THE DRAWINGS

FIG. 3 shows an example of a damping signal according to the present invention.

DETAILED DESCRIPTION OF THE PREFERRED EMBODIMENTS

Hereinafter, the pulse light receiving time measurement apparatus and the distance measurement apparatus including the pulse light receiving time measurement apparatus according to the embodiments of the present invention will be described with reference to the drawings.

Figure 1:
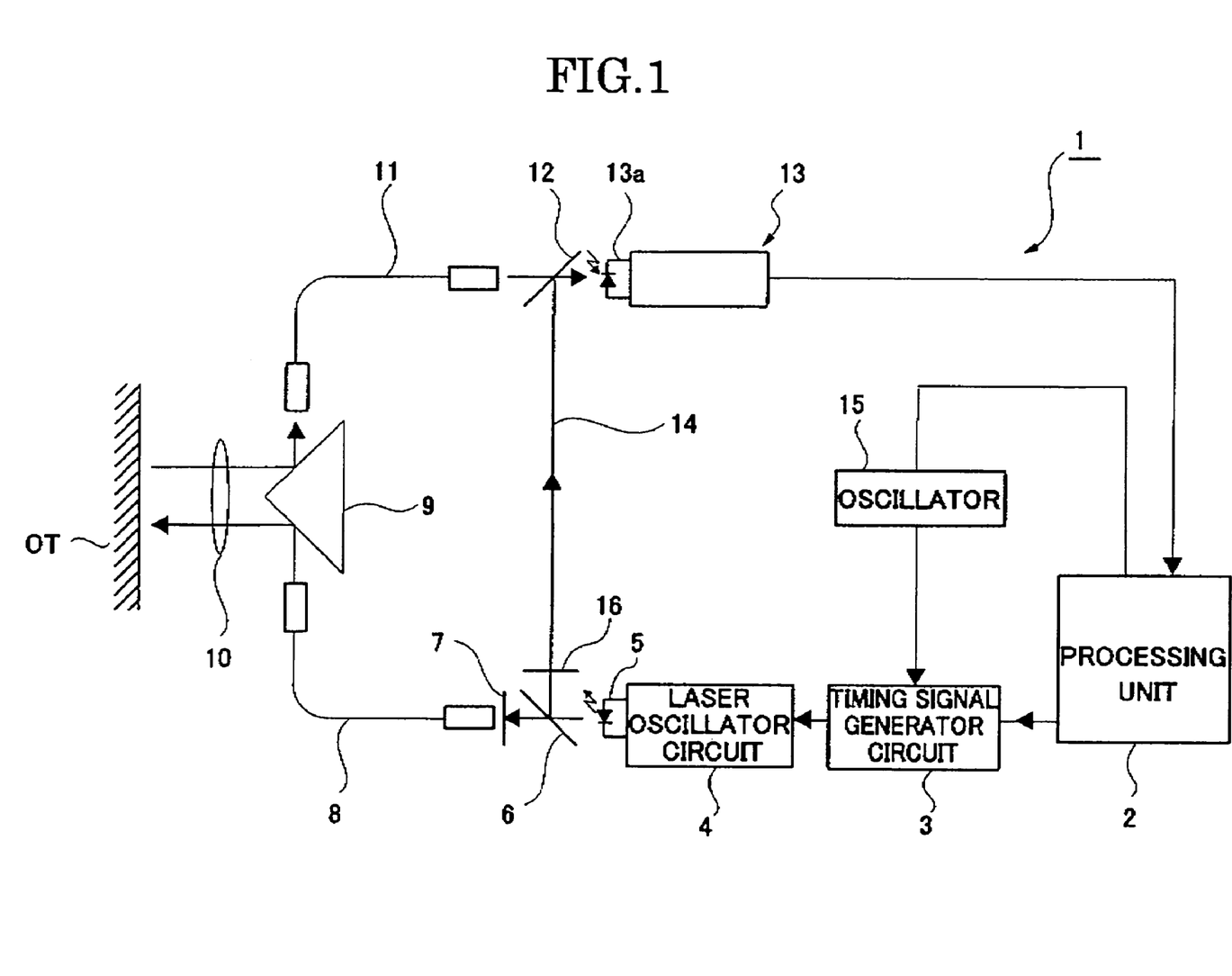
FIG. 1 is a block circuit diagram showing an example of a pulse light receiving time measurement apparatus according to the first embodiment of the present invention.

FIG. 1 is a block circuit diagram showing an example of the pulse light receiving time measurement apparatus according to the first embodiment of the present invention.

In FIG. 1, the number 1 represents the pulse light receiving time measurement apparatus according to the present invention, and OT represents an object to be measured. The pulse light receiving time measurement apparatus includes a processing unit 2, a timing signal generator circuit 3, a laser oscillator circuit 4, a light emitting element 5, a half mirror 6, an optical shutter 7, a light guide fiber 8, a triangular prism 9, an objective lens 10, a light guide fiber 11, a half mirror 12, an optical receiver circuit 13, an internal optical reference path 14, an oscillator 15, and an optical shutter 16.

The processing unit has a function of measuring a distance to an object OT, that is, it mainly function as a pulse light receiving time measurement circuit which measures receipts of optical pulses.

Given an instruction from the processing unit 2, the timing signal generator circuit 3 supplies a timing signal to the laser oscillator circuit 4 according to a reference signal from the oscillator 15. The laser oscillator circuit 4 outputs a driving signal to the light emitting element according to the timing signal. The light emitting element 5 is composed of, for example, pulse laser diode, and generates pulse laser light at a predetermined timing.

The half mirror 6 transmits a part of the pulse laser light from the light emitting element 5 and reflects a part of the rest thereof to the internal optical reference path 14.

The optical shutter 7 functions to decide whether or not to guide the pulse laser light transmitted through the half mirror 6 to the light guide fiber 8. The optical shutter 16 functions to decide whether or not to guide the pulse laser light reflected by the half mirror 6 to the internal optical reference path 14.

The light guide fiber 8 guides the pulse laser light transmitted through the optical shutter 7 to the triangular prism 9. The triangular prism 9 reflects the pulse laser light emitted from the light guide fiber 8 to the objective lens 10. The pulse laser light reflected by the triangular prism 9 is irradiated to the object to be measured OT via the objective lens 10.

The pulse laser light reflected from the object to be measured is converged by the objective lens 10 and guided to the triangular prism 10. Then, it is reflected by the triangular prism 9 to the light guide fiber 11, and transmits through the light guide fiber 11 and is guided to the half mirror 12.

The pulse laser light guided to the internal optical reference path 14 is guided to the half mirror 12, and then reflected by the half mirror 12 to the light receiving element 13a constituting a part of the optical receiver circuit 13. The pulse laser light guided by the light guide fiber 11 transmits through the half mirror 12 to be guided to the light receiving element 13a.

Figure 2:
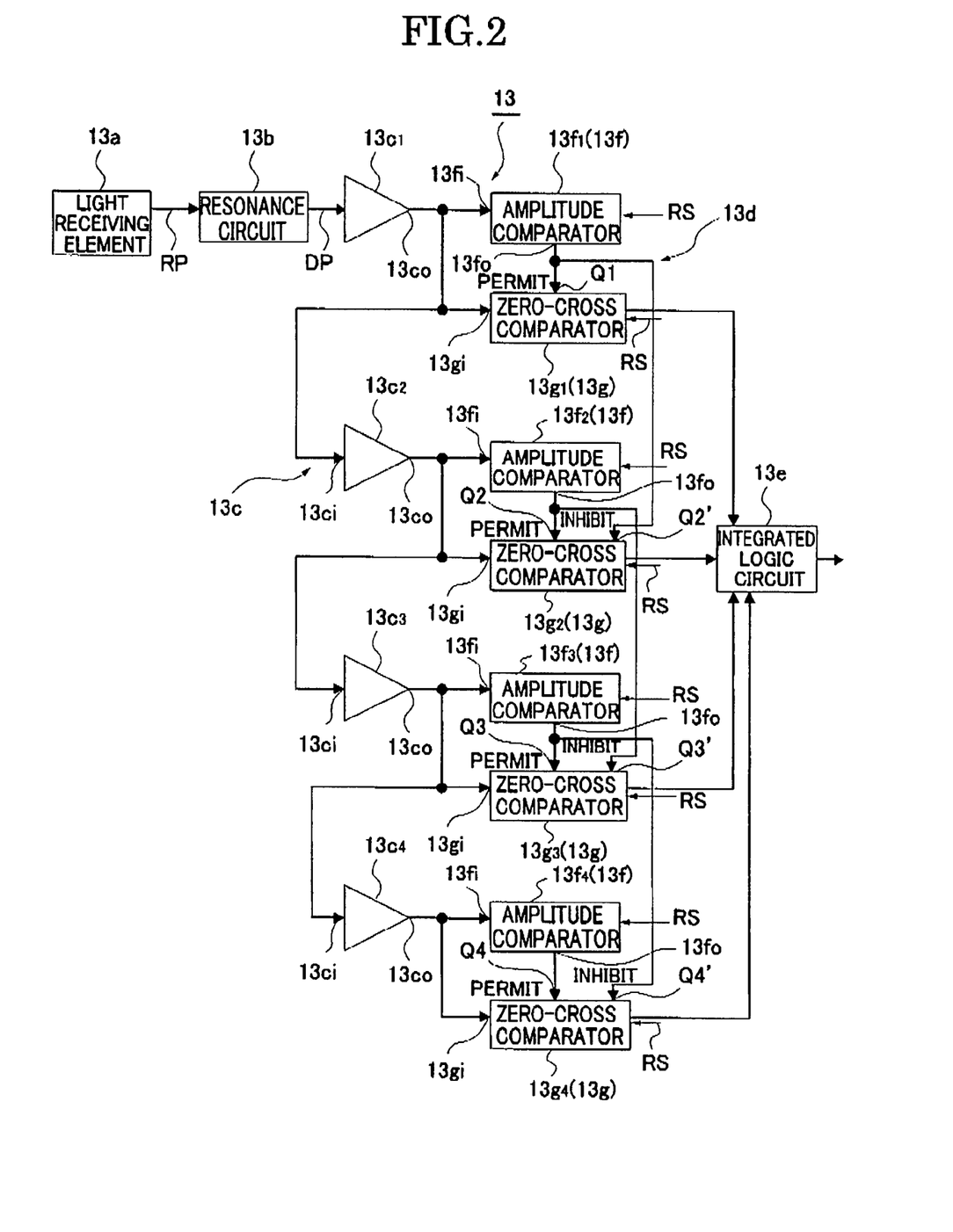
FIG. 2 is a circuit diagram of an optical receiver circuit shown in FIG. 1.

The optical receiver circuit 13 has, as shown in FIG. 2, a resonance circuit 13b, a multi-stage amplifier group 13c, a damping signal processing part 13d, and an integrated logic circuit 13e.

Figure 3A:
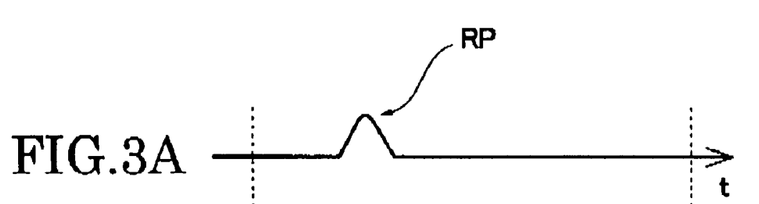
FIG. 3A is a waveform of a pulse signal of reflected pulse light.

The light receiving element 13a photoelectrically converts the reflected pulse light into a pulse signal RP shown in FIG. 3A for output. The resonance circuit 13b outputs an attenuated oscillatory waveform signal (damping signal) DP in response to the input of the pulse signal RP.

Figure 3B:
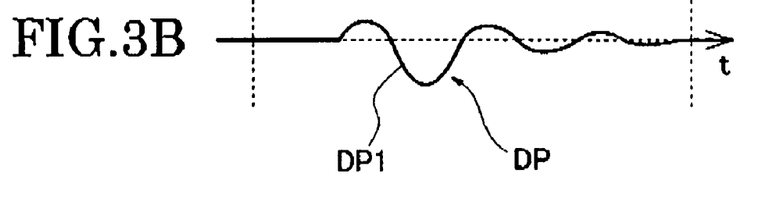
FIG. 3B is a waveform of a damping signal responding to the pulse signal.

For example, when a pulse signal RP as shown in FIG. 3A is inputted to the resonance circuit 13, an attenuated oscillatory waveform signal DP is obtained. The attenuated oscillatory waveform signal DP has a waveform in which a mountain like shape and a valley like shape are alternatively, periodically appear, and its amplitude gradually decreases, as shown in FIG. 3B.

The multi-stage amplifier group 13c is composed of amplifiers 13c1, 13c2, 13c3, and 13c4 with a fixed gain A. When the gain A is 10, the damping signal DP output from the resonance circuit 13b is amplified by 10 times by the amplifier 13c1, amplified by 100 times by the amplifier 13c2, amplified by 1,000 times by the amplifier 13c3, and amplified by 10,000 times by the amplifier 13c4, The damping signal processing part 13d is composed of an amplitude comparator group 13f and a zero-cross comparator group 13g. The amplitude comparator group 13f is composed of amplitude comparators 13f1, 13f2, 13f3, and 13f4, The zero-cross comparator group 13g is composed of zero-cross comparators 13g1, 13g2, 13g3, and 13g4.

The output port 13co of the amplifier 13c1 is connected with the input port 13fi of the amplitude comparator 13f1, the input port 13gi of the zero-cross comparator 13g1, and the input port 13ci of the amplifier 13c2. The output port 13co of the amplifier 13c2 is connected with the input port 13fi of the amplitude comparator 13f2, the input port 13gi of the zero-cross comparator 13g2, and the input port 13ci of the amplifier 13c3. The output port 13co of the amplifier 13c3 is connected with the input port 13fi of the amplitude comparator 13f3, the input port 13gi of the zero-cross comparator 13g3, and the input port 13ci of the amplifier 13c4. The output port 13co of the amplifier 13c4 is connected with the input port 13fi of the amplitude comparator 13f4, and the input port 13gi of the zero-cross comparator 13g4.

Figure 4:
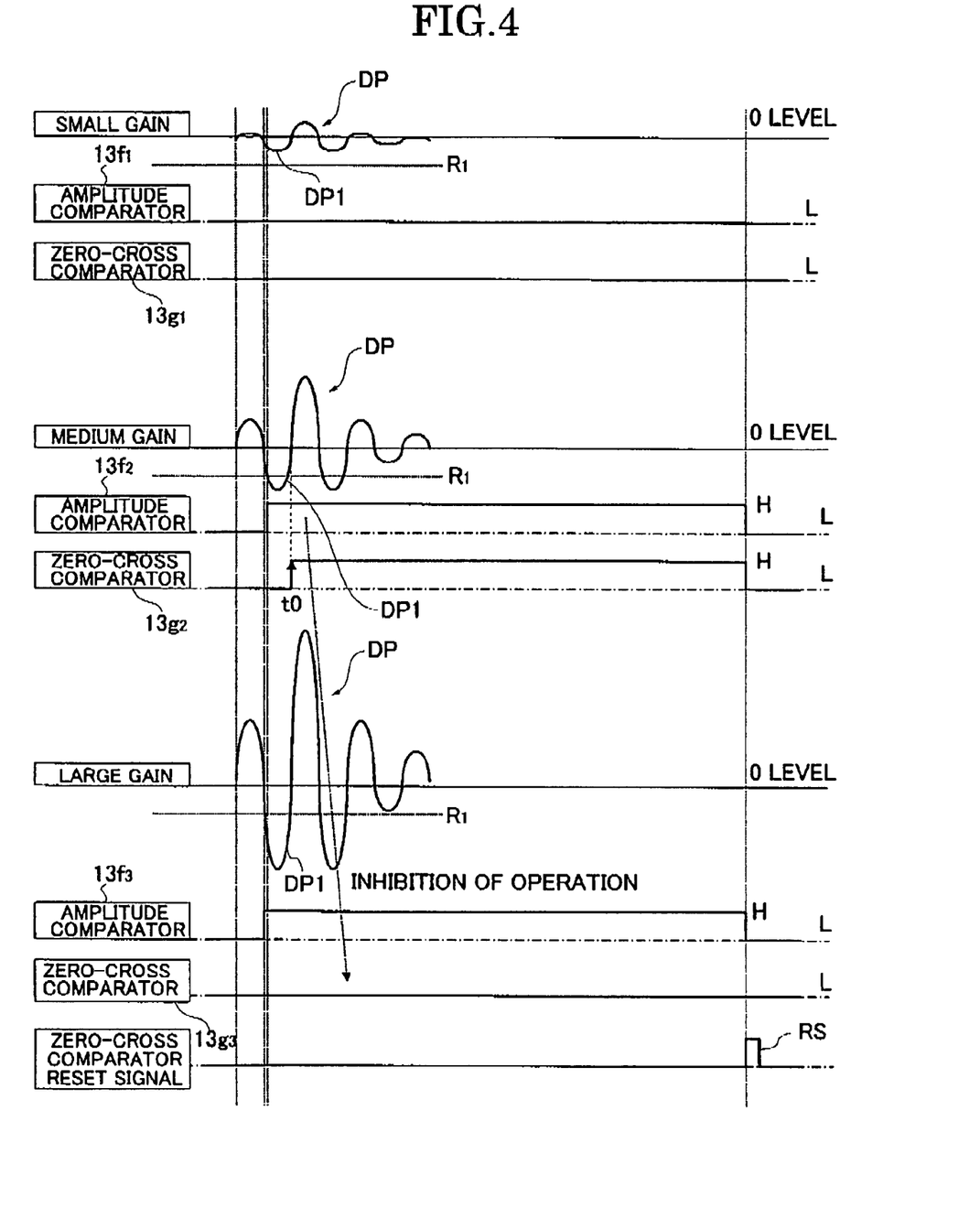
FIG. 4 shows a timing chart for explaining an operation of the optical receiver circuit in FIG. 2.

The amplitude comparators 13f1, 13f2, 13f3, and 13f4 as shown in FIG. 4 compares the level of the damping signal DP having a predetermined response waveform DP1 with a reference level R1. When the absolute value of the response waveform DP1 is smaller than the reference level R1, they output an L signal (low-level signal). When the absolute value of the response waveform DP1 is larger than the reference level R1, they output an H signal (high-level signal). Herein, the H signal functions as a permit signal and an inhibit signal.

The output port 13fo of the amplitude comparator 13f1 is connected with the permit terminal Q1 of the zero-cross comparator 13g1 and the inhibit terminal Q2' of the zero-cross comparator 13g2. The output port 13fo of the amplitude comparator 13f2 is connected with the permit terminal Q2 of the zero-cross comparator 13g2 and the inhibit terminal Q3' of the zero-cross comparator 13g3. The output port 13fo of the amplitude comparator 13f3 is connected with the permit terminal Q3 of the zero-cross comparator 13g4 and the inhibit terminal Q4' of the zero-cross comparator 13g4. The output port 13fo of the amplitude comparator 13f4 is connected with the permit terminal Q4 of the zero-cross comparator 13g4.

The zero-cross comparators 13g1, 13g2, 13g3, and 13g4 are configured to output the L signal when the L signal is input to the permit terminal thereof, and to output the H signal when the H signal is input to both of the permit and inhibit terminals thereof.

The zero-cross comparators are configured to output the H signal when the H signal is input to the permit terminal and the L signal is input to the inhibit terminal.

As shown in FIG. 4, for example, in comparing the response waveform DP1 of the damping signal DP in the first amplifier 13c1 with the reference level R1, the absolute value of the response waveform DP1 is smaller than the reference level R1; therefore, the amplitude comparator 13f1 outputs the L signal, and the zero-cross comparator 13g1 outputs the L signal.

Next, in comparing the response waveform DP1 of the damping signal DP in the second amplifier 13c2 with the reference level R1, the absolute value of the response waveform DP1 is larger than the reference level R1; therefore, the amplitude comparator 13f2 outputs the H signal, and the zero-cross comparator 13g2 outputs the H signal at a zero-cross point.

In comparing the response waveform DP1 of the damping signal DP in the third amplifier 13c3 with the reference level R1, the absolute value of the response waveform DP1 is larger than the reference level R1, so that the zero-cross comparator 13g3 goes into a high level. However, since the amplitude comparator 13f2 outputs the H signal, the zero-cross comparator 13g3 is inhibited from outputting the H signal and remains to output the L signal. Likewise, although the zero-cross comparator 13g4 also goes into a high level, the amplitude comparator 13f3 outputs the H signal so that the zero-cross comparator 13g4 is inhibited from outputting the H signal and remains to output the L signal.

Accordingly, the H signal is output from one of the four zero-cross comparators 13g1, 13g2, 13g3, and 13g4, and input to the integrated logic circuit 13e which is composed of an OR circuit, for example. Then, the H signal from the zero-cross comparator is input to a not-shown time-axis measurement circuit which partially constitutes the processing unit 2. The processing unit 2 obtains a distance to the object to be measured based on a rising point t0 of the H signal.

After detecting the damping signal DP, the amplitude comparators 13f1, 13f2, 13f3, and 13f4 and the zero-cross comparator 13g1, 13g2, 13g3, and 13g4 are reset by a reset signal RS.

Here, as shown in FIG. 4, when the zero-cross comparator 13g2 outputs the H signal, the processing unit 2 obtains the distance from the measurement apparatus to the object to be measured OT based on a difference in time between the rising point of the H signal of the zero-cross comparator 13g2, which is obtained from the damping signal based on the pulse laser light guided to the internal optical reference path 14, and the rising point of the H signal obtained from the damping signal corresponding to the reflected pulse light from the object to be measured OT.

Figure 5:
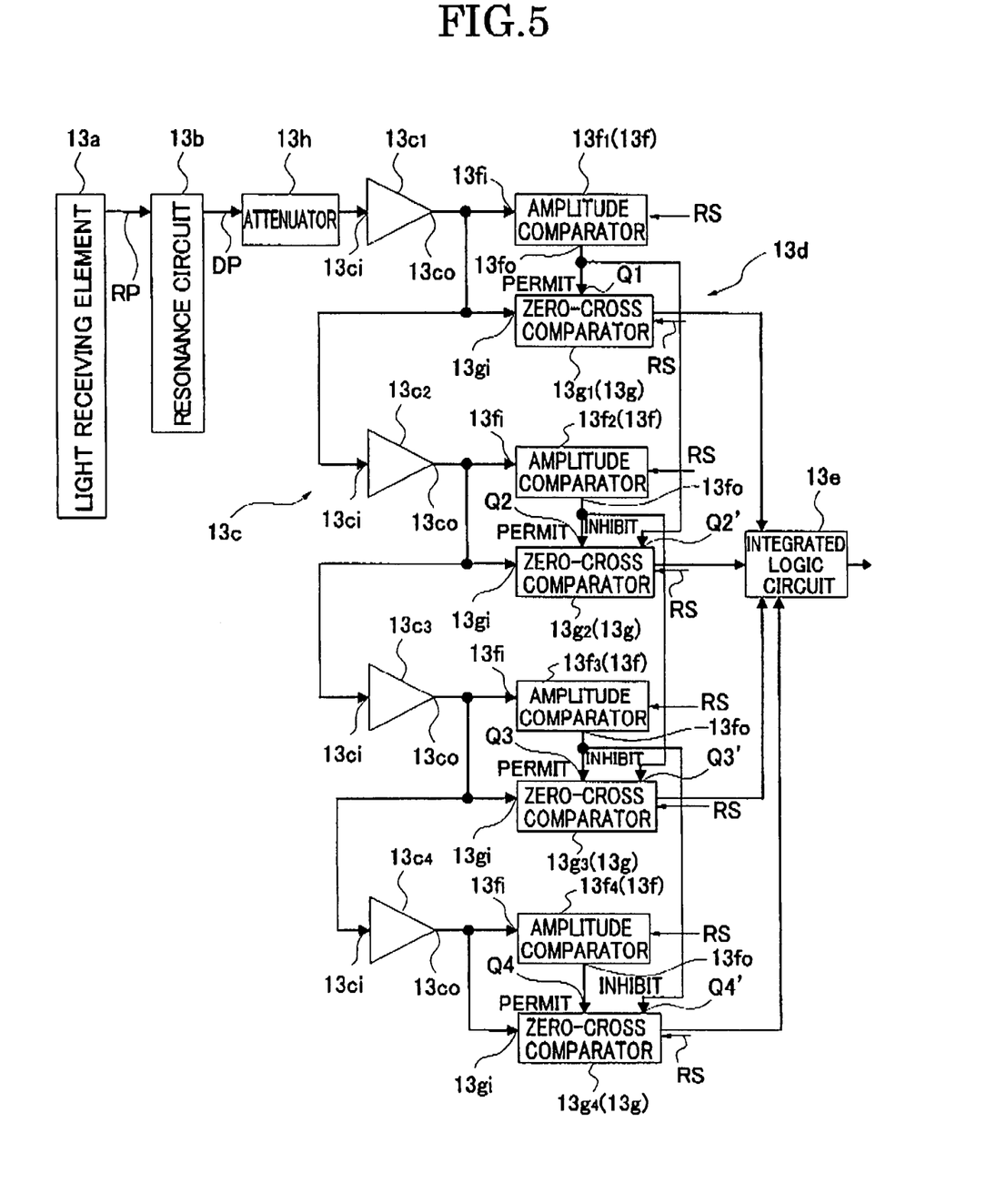
FIG. 5 shows a circuit diagram of the optical receiver circuit in the pulse light receiving time measurement apparatus according to the second embodiment of the present invention.

FIG. 5 shows the optical receiver circuit in the pulse light receiving time measurement apparatus according to the second embodiment of the present invention. In the second embodiment, an attenuator 13h is provided between the resonance circuit 13b and the multi-stage amplifier group 13c.

With the provision of the attenuator 13h, it is made possible to provide uniformly attenuated damping signals DP to the amplifier in the subsequent stage 13c, even when the object to be measured OT is an artificial object within a close distance, and bright reflected pulse light is received at the light receiving element 13a. This accordingly enables the calculation of the light receiving time without saturating the damping signal.

In other words, according to the second embodiment, it is able to process a large amount of received pulse light by attenuating the amplitude of the damping signal at an arbitrary attenuation rate, so that the light receiving time can be calculated without saturating the damping signal, even when bright reflected pulse light is received at the light receiving element 13a.

Figure 6:
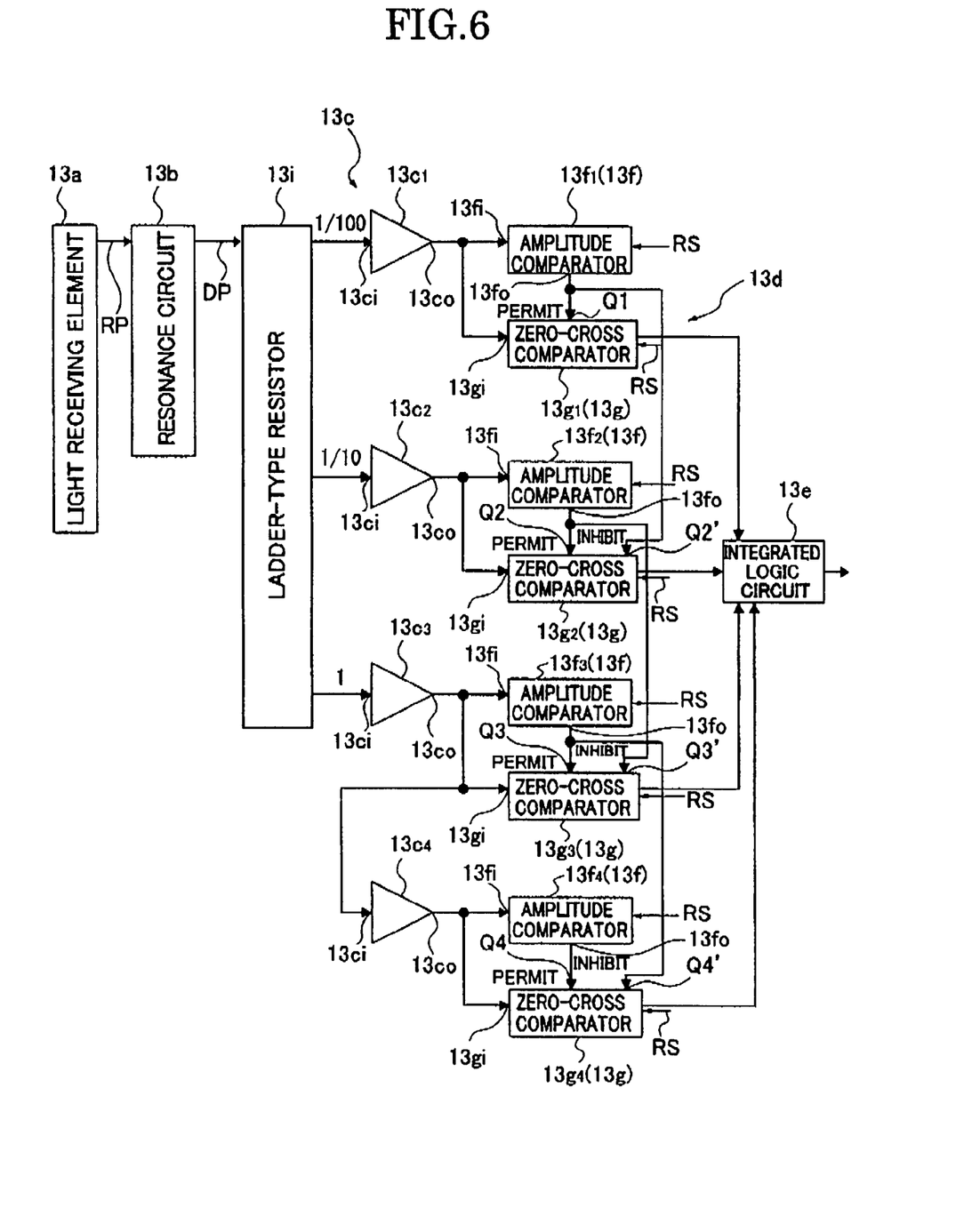
FIG. 6 shows a block circuit diagram of the optical receiver circuit in the pulse light receiving time measurement apparatus according to the third embodiment of the present invention.

FIG. 6 shows the optical receiver circuit in the pulse light receiving time measurement apparatus according to the second embodiment of the present invention. In the third embodiment, a ladder-type attenuator 13i (ladder-type resistor) is provided between the resonance circuit 13b and the multi-stage amplifier group 13c.

Figure 7:
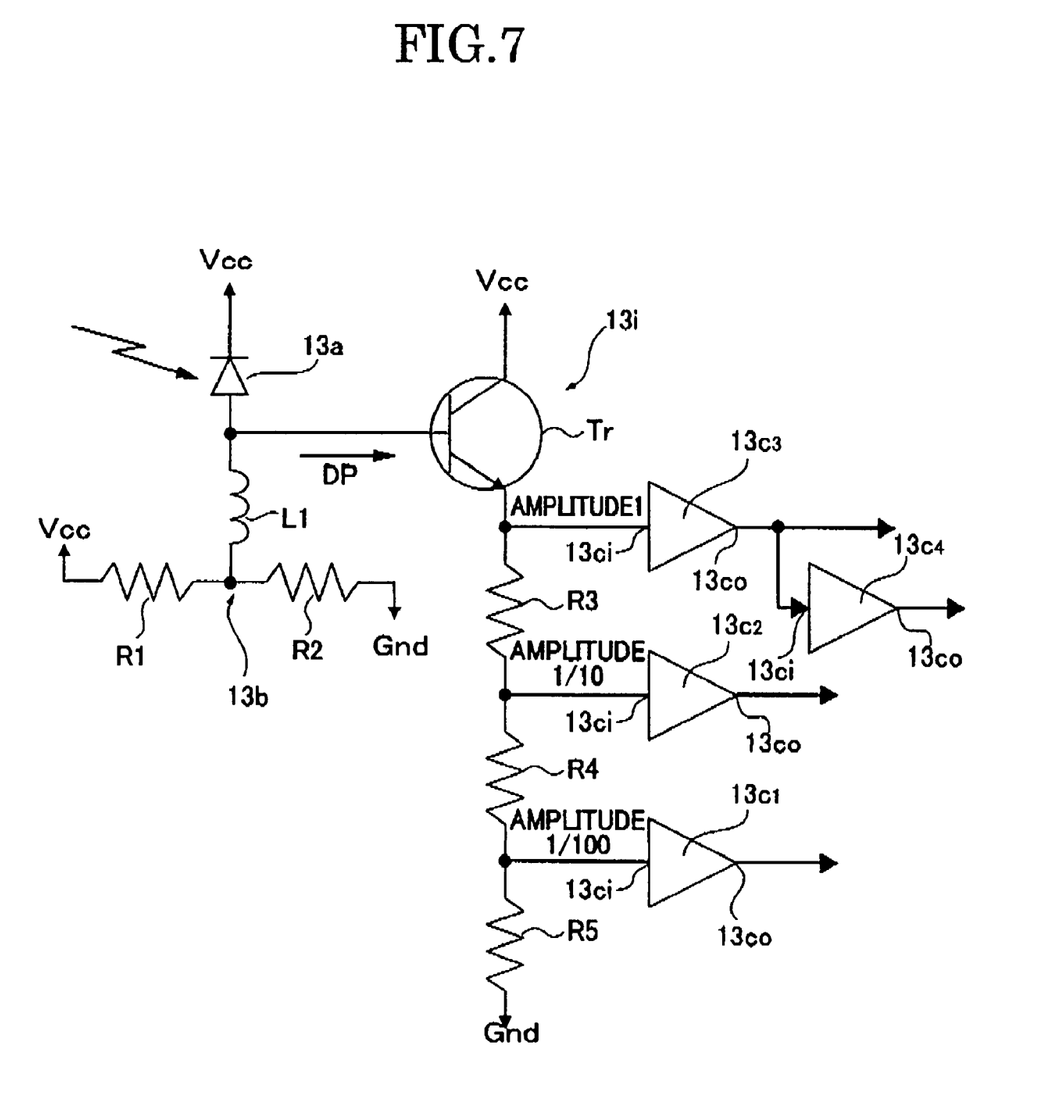
FIG. 7 is a circuit diagram showing a detailed configuration of a ladder-type resistor shown in FIG. 6.

According to the third embodiment, the resonance circuit 13b includes resistors R1, R2, and a coil L1 as shown in FIG. 7. The power supply voltage Vcc is applied to one end of the resistor 1 while the other end of the resistor R1 is connected with one end of the resistor R2 and one end of the coil L1. The other end of the resistor R2 is grounded (GND), and the other end of the coil L1 is connected with an anode of the light receiving element 13a. The power supply voltage Vcc is applied to a cathode of the light receiving element 13a.

The ladder-type attenuator 13i includes a transistor Tr and resistors R3, R4, and R5. A connector of the transistor Tr is applied with the power supply voltage Vcc, A base of the transistor Tr is connected with the anode of the light receiving element 13a. An emitter of the transistor Tr is connected with one end of the resistor R3 and the input port 13ci of the amplifier 13c3.

The other end of the resistor 3 is connected with one end of the resistor R4 and the input port 13ci of the amplifier 13c2, while the other end of the resistor 4 is connected with one end of the resistor R5 and the input port 13ci of the amplifier 13c1. The other end of the resistor R5 is grounded.

Upon receiving the reflected pulse light at the light receiving element 13a, the resonance circuit 13b converts a photoelectrically converted signal thereof into a damping signal DP for input to the base of the transistor Tr. The damping signal DP is input to the input port 13ci of the amplifier 13c3 with amplitude coefficient 1. The damping signal DP is then attenuated by the amplitude coefficient, for example, 1/10 by the resistor R3, and inputted to the input port 13ci of the amplifier 13c2. Further, the damping signal DP is attenuated by the amplitude coefficient, for example, 1/100 by the resistor R4, and inputted to the input port 13ci of the amplifier 13c1.

Accordingly, when the gain of each amplifier is 10, the damping signal DP amplified by 100 is output from the output port 13co of the amplifier 13c4, and the damping signal DP amplified by 10 is output from the output port 13co of the amplifier 13c3. Likewise, the damping signal DP amplified by 1 is output from the output port 13co of the amplifier 13c2, and the damping signal DP amplified 1/10 is output from the output port 13co of the amplifier 13c1.

The provision of the ladder-type attenuator 13i as described above makes it possible to generate the damping signal with the gain 1 or more from the damping signal with the gain 1 or less. As a result, it is possible to measure, in a wide dynamic range, the distance from the measurement apparatus to various objects which ranges from one with high reflectivity within a close distance or one with low flexibility within a far distance.

In other words, the pulse light receiving time measurement apparatus according to the third embodiment is configured such that a plurality of damping signals arbitrarily voltage-divided by the ladder-type attenuator 13i and a damping signal not voltage-divided are input to the multi-stage amplifier group 13c, whereby the range of detection of amounts of light can be expanded from extremely small to large.

According to the present invention, it is able to provide the pulse light receiving time measurement apparatus suitable for use in the distance measurement apparatus which performs three-dimensional, high-speed measurement of various objects ranging from the natural object with low reflectivity to the retroreflective member with high reflectivity without enlarging the circuit scale, as well as to provide the distance measurement apparatus.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A pulse light receiving time measurement apparatus comprising:
   a light receiving element receiving reflected pulse light from an object to be measured;
   a pulse light receiving time measurement circuit measuring a time when pulse light is irradiated to the object to be measured and a time when the reflected pulse light from the object to be measured is received at the light receiving element;
   a resonance circuit converting an optical pulse signal of the reflected pulse light from the light receiving element into a damping signal;
   a multi-stage amplifier group amplifying the damping signal from the resonance circuit;
   a damping signal processing circuit composed of amplitude comparators and zero-cross comparators, and processing the damping signal from each stage of the multi-stage amplifier group which is connected with a pair of an amplitude comparator and a zero-cross comparator, the amplitude comparators comparing amplitude of the damping signal with a predetermined value, the zero-cross comparators detecting that the damping signal crosses a bias level; and
   an integrated logic circuit combining a plurality of signal lines from the zero-cross comparator into one for output to the pulse light receiving time measurement circuit, wherein
   operations of the respective zero-cross comparators are determined according to comparison results of the respective amplitude comparators for the amplifier group.

2. A pulse light receiving time measurement apparatus according to claim 1, further comprising
   an attenuator composed of a ladder-type resistor, provided between the resonance circuit and the multi-stage amplifier group, and attenuating an amplitude of received pulse light of a large amount at an arbitrary attenuation rate.

3. A pulse light receiving time measurement apparatus according to claim 1, wherein
   the damping signal from the resonance circuit is input to the attenuator, and a plurality of damping signals voltage-divided arbitrarily by the ladder-type resistor and a damping signal not voltage-divided are input to the multi-stage amplifier group, to expand a range of detection of amounts of light from extremely small to large.

4. A pulse light receiving time measurement apparatus comprising:
- a light receiving element receiving reflected pulse light from an object to be measured and pulse light guided to an internal optical reference path;
- a pulse light receiving time measurement circuit measuring a time when pulse light is irradiated to the object to be measured and a time when the reflected pulse light from the object to be measured is received at the light receiving element;
- a resonance circuit converting an optical pulse signal of each pulse light output from the light receiving element into a damping signal;
- a multi-stage amplifier group amplifying a damping signal output from the resonance circuit;
- a damping signal processing circuit composed of amplitude comparators and zero-cross comparators, processing a damping signal output from each of the multi-stage of the amplifier group which is connected with a pair of an amplitude comparator and a zero-cross comparator, and determining operations of the respective zero-cross comparators according to comparison results of the respective amplitude comparators for the amplifier group, the amplitude comparators comparing amplitude of the damping signal with a predetermined value, the zero-cross comparators detecting that the damping signal crosses a bias level; and
- an integrated logic circuit combining a plurality of signal lines from the zero-cross comparator into one for output to the pulse light receiving time measurement circuit.

5. A pulse light receiving time measurement apparatus according to claim 4, further comprising
an attenuator composed of a ladder-type resistor and provided between the resonance circuit and the multi-stage amplifier group.

6. A pulse light receiving time measurement apparatus according to claim 5, wherein
the damping signal output from the resonance circuit is input to the attenuator, and a plurality of damping signals voltage-divided by the ladder-type resistor and a damping signal not voltage-divided are input to the multi-stage amplifier group.

7. A distance measurement apparatus comprising:
- a light receiving element receiving reflected pulse light from an object to be measured and pulse light guided to an internal optical reference path;
- a resonance circuit converting an optical pulse signal of each pulse light output from the light receiving element into a damping signal;
- a multi-stage amplifier group amplifying a damping signal output from the resonance circuit;
- a damping signal processing circuit composed of amplitude comparators and zero-cross comparators, processing a damping signal output from each of the multiple stages of the amplifier group to obtain a signal for acquiring a difference in time between emission of pulse light and the reflected pulse light's reaching the light receiving element; and
- a processing unit receiving the signal processed by the damping signal processing circuit and obtaining a distance from the measurement apparatus to the object to be measured according to the difference in time acquired.

8. A distance measurement apparatus according to claim 7, wherein
the damping signal processing circuit is composed of a group of amplitude comparators comparing amplitude of the damping signal with a predetermined value, and a group of zero-cross comparators detecting that the damping signal crosses a bias level, the amplitude comparators and the zero-cross comparators being of a same number.

9. A distance measurement apparatus according to claim 8, further comprising
an integrated logic circuit provided between the damping signal processing circuit and the processing unit and combining respective signal lines from the zero-cross comparators into one for output to the processing unit.

10. A distance measurement apparatus according to claim 8, wherein
each of the zero-cross comparators outputs the signal for acquiring the difference in time to the processing unit, and each of the amplitude comparators outputs, to each zero-cross comparator, a permit/inhibit signal for selectively permitting/inhibiting the output of the signal for acquiring the difference in time to the processing unit.

11. A distance measurement apparatus according to claim 10, further comprising
an attenuator composed of a ladder-type resistor and provided between the resonance circuit and the multi-stage amplifier group.

12. A distance measurement apparatus according to claim 11, wherein
the damping signal output from the resonance circuit is input to the attenuator and a plurality of damping signals voltage-divided by the ladder-type resistor and a damping signal not voltage-divided are input to the multi-stage amplifier group.

13. A distance measurement apparatus according to claim 12, wherein
the resonance circuit is composed of a plurality of resistors and one or more coils, and the attenuator is composed of one or more transistors and a plurality of resistors.

14. A distance measurement apparatus according to claim 7, wherein
the multi-stage amplifier group is composed of a plurality of amplifiers having a same gain.

15. A distance measurement apparatus according to claim 14, wherein
upon every amplification by each amplifier, the damping signal output from the resonance circuit is amplified by a multiple of a power of the gain.

* * * * *